3,212,859
SOLIDS-FLUID CONTACTOR
John Mitacek, Bartlesville, Okla., assignor to Phillips Petroleum Company, a corporation of Delaware
Filed June 18, 1962, Ser. No. 203,078
3 Claims. (Cl. 23—283)

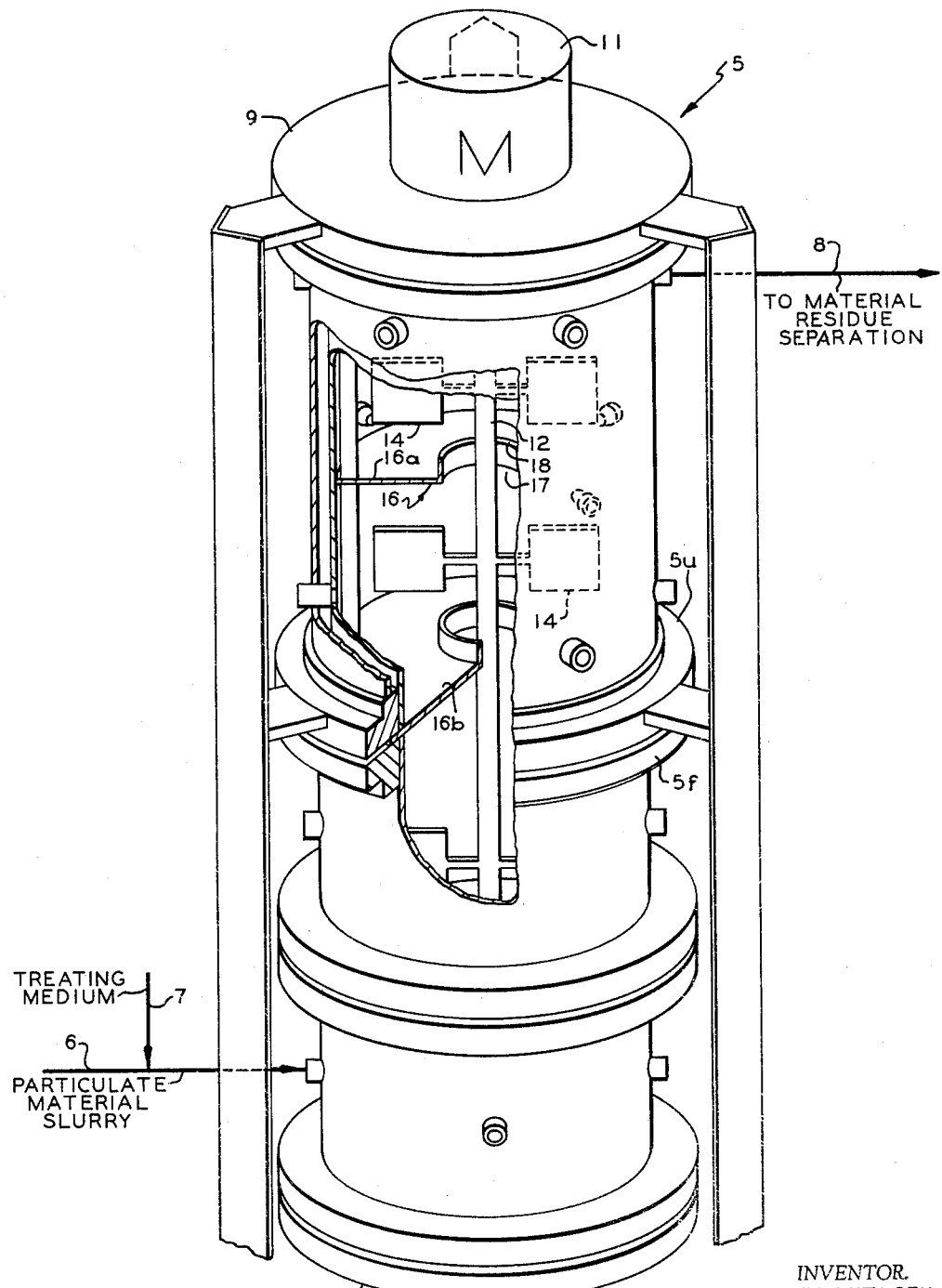

This invention relates to apparatus for improved liquid-solid mixing. In another aspect it relates to means for initimate contacting of a slurry of particulate material with a lighter liquid medium.

Apparatus for liquid-solid mixing employing vessels stirred by radial type blades or paddles are commonly taught in the mixing art. The modification of annular spacers disposed to define a plurality of compartments within such vessels have also been disclosed to enhance the mixing effect.

In separating solid olefin polymers from catalyst residues present in the polymerization zone effluent, an agitated contacting zone is employed for contacting the effluent with a treating agent, such as a chelator, to remove the residues. The removal of such impurities is imperative, since they contribute significantly to deficiencies in the physical properties of the recovered polymer that cannot be tolerated in a commercial product.

In attempting to adapt conventional stirred vessels to serve as vessels for the contacting of the slurry of polymer in hydrocarbon diluent with the chelating agent in the form of a liquid medium, considerable difficulty was experienced in obtaining homogenous mixing and sufficiently long contact times before the treated slurry passed from the contactor on to further treatment, such as polymer separation. This was attributable to the fact that a standard compartmented, agitated vessel permits the heavy slurry to settle to the bottom of the contactor too quickly, preventing optimum intimate contacting of slurry and chelator. Moreover, accumulation of particulate material in bottom of vessels requires frequent shut downs for cleanout.

It is, therefore, an object of this invention to provide means for intimately contacting a slurry of particulate material and a lighter liquid medium for a controlled period of time.

It is a further object to provide an improved apparatus for homogenously and intimately mixing liquids of dissimilar densities for a desired residence period.

It is a further object to provide novel baffling means positioned in a stirred vessel so as to inhibit the settling tendency of a slurry introduced into one end of said vessel and withdrawn from the other end thereof.

Other objects, aspects and advantages will become apparent from a study of the disclosure, the drawing and the appended claims.

According to the present invention, a slurry of finely divided particulate material particles dispersed in a liquid diluent, and a treating agent, preferably liquid in form, are passed to the novel contacting apparatus of this invention, and achieve intimate and controlled intermixing.

A more comprehensive understanding of this invention can be obtained by reference to the drawing, which is a perspective view in partial section of the contacting apparatus of this invention. A generally cylindrical, vertically elongated shell, generally designated 5, serves as the contacting vessel. Conduit 6 communicates with the lower portion of vessel 5 for introducing the effluent, from a polymerization zone (not shown), comprising a finely divided olefin polymer present in unreacted monomer or, perhaps dispersed in a hydrocarbon diluent. Conduit 7 also communicates with vessel 5 via conduit 6 for introducing the treating agent, such as chelating compound preferably in an inert diluent like pentane. Treated slurry and excess treating agent are drawn off from the upper portion of vessel 5 to further purification and separating (not shown) via conduit 8. Alternately, the two feed streams can be introduced separately into the bottom of vessel 5. The apparatus of this invention may also be operated by introducing the reactants into the upper portion and withdrawing from the lower portion.

The vessel is closed by a top plate 9 supporting an electric motor 11, which is coupled to a central vertical shaft 12. The shaft 12 carried secured thereto a plurality of stirrer blades 14 in groups of one or more (only two shown for clarity) which groups are laterally extending from the shaft. Each group of blades are mounted on the shaft at suitable intervals, which are equal in this embodiment. The blades are detachable for disassembly and cleaning of the vessel.

A plurality of horizontally disposed, flat annular baffles, such as 16, are mounted immovably within the vessel along the inner wall thereof, at suitable intervals, which are equal in the illustrated embodiment. These horizontal baffles are imperforate except for central, circular openings 17, which are sufficiently large to permit free passage of shaft 12, but said openings are of substantially smaller diameter than the diameter of the cylindrical zone defined by the moving blades 14. Each baffle 16 is provided with a circular vertical riser 18 secured to the inner edge thereof. The ratio of the diameter of the horizontal baffles 16 to the height of said vertical risers 18 is in the range of 12 to 3. The ratio of the diameters of said circular opening to said motor shaft is in the range between 6 and 2.

Baffles 16 and risers 18 divide the vessel into a vertical series of compartments, which communicate consecutively through central openings 17. In the embodiment being described, the diameter of the openings 17 are equal, as are those of blades 14. The relative diameter of openings 17 and grouped blades 14 forms an interleaving effect between these alternatively disposed parts that interposes a contacting zone that controls the settling time of the particulate material slurry from the upper to the lower portion of the shell. It will be further noted that each horizontal group of blades is centered within a compartment in relation to the mid-level of the enclosing compartment.

Regarding the horizontal baffles, it is noted that the topmost baffle, 16a, is welded in place, in the uppermost section of vessel 5. Additional stages can be added to the vessel, as many as desired, by securing to the bottom end of the vessel, flanged sections, such as 5f. Removable horizontal baffles, such as 16b, are sealably positioned between upper section 5u and adjacent flanged section 5f. When the desired number of stages has been provided in this manner, the open bottom end is closed with plate 9b, the bottom of shaft 12 being centrally and pivotably anchored therein. This construction plainly facilitates changing the residence time in the vessel, and also readily permits disassembly for cleaning, and the like.

Operating as a multi-stage contacting vessel is described. A slurry of finely divided polymer of polypropylene dispersed in a hydrocarbon diluent is pumped from a polymerization zone (not shown) to three-stage contactor 5. A liquid chelating agent communicates with the slurry conduit just prior to entry into the contactor. The fluid pressure of the entering stream tends to drive it upwardly through the central openings of the contactor, with the rotation blades providing initimate mixing of the admitted liquids. The annulus defined by said openings and said shaft was about ½ inch wide. The denser polymer particles previously had strong tendency to settle back to the bottom stage of the baffle of the contractor; however, incorporation of the vertical risers substantially overcomes the accumulation of the particles in the lower portion. The vertical risers were two inches high, and baffles were 12 inches in diameter. Thus, the slurry had its desired homogenous contacting time in the vessel, without excessive periodic shutdown of the contactor to clean out an obstruction pile up of particulate polymer.

Washing of the resulting treated slurry with a low boiling hydrocarbon diluent, produces a purified solid polyolefin slurry bottoms product, and an overhead liquid comprising the metal chelates formed in the contacting apparatus, among other materials, which pass to disposal or recovery, as the need may be.

Reasonable variation and modification are possible within the scope of the disclosure, the drawing and the appended claims to the invention.

I claim:

1. Contacting apparatus medium comprising: a generally cylindrical vertically elongated outer shell; a motor; a shaft operatively secured to said motor and being driven thereby, said shaft depending axially within said shell; a plurality of elements spaced along and secured to said shaft; each of said elements consisting of at least one laterally extending stirring blade; a plurality of horizontal annular baffles spaced along and secured to the inner wall of said shell having central openings providing sufficiently large radical clearance to permit the free passage of said shaft and otherwise being substantially imperforate and unobstructed; the diameter of said openings being less than the diameter of said element; the ratio of the diameter of said circular opening to said shaft ranging between 2 and 6; each of said horizontal baffles having circular vertical risers secured to the inner edges thereof and thus defining a series of compartments which are in consecutive communication through said central openings; the ratio of the diameters of said horizontal baffles to the height of said vertical risers being in the range of 12 to 3; each one of said elements disposed intermediate the ends of one compartment as defined by said horizontal baffles and in axially spaced relationship with said ends, whereby the axial interval between said alternating elements and said baffles, and the further interleaving thereof, interpose a contacting zone that controls the settling time of liquids passing from one end to the other end of said shell; first conduit means for introducing first and second liquids to be contacted to said one end of said shell; and second conduit means for drawing the resulting contacted liquids from said other end of said shell.

2. A contacting vessel comprising: a generally cylindrical vertically elongated shell; means for introducing materials to be contacted at one end; means for withdrawing materials contacted at the other end; a plurality of horizontally disposed baffles, each having a single central unobstructed opening with a circular vertical projection extending from the periphery of the opening in the direction of flow through the vessel and otherwise being substantially imperforate and unobstructed, the ratio of the diameter of said horizontal baffles to the height of said vertical projections being in the range of 12 to 3, said baffles being positioned at intervals in said shell and secured thereto with said openings in vertical alignment to divide said shell into a plurality of vertically disposed zones with consecutive communication through said openings; a rotatable shaft extending axially through said shell passing through said openings and operatively secured to driving means; and a plurality of agitating means disposed horizontally on said shaft positioned to provide at least one agitating means in each of said zones above said projections, each of said agitating means having a diameter greater than the diameter of said openings.

3. An apparatus according to claim 2, wherein in at least one intermediate compartment, said element is situated at equal distances from the respectively adjacent faces of said horizontal baffles.

References Cited by the Examiner

UNITED STATES PATENTS

| | | | |
|---|---|---|---|
| 2,665,196 | 1/54 | Poffenberger | 23—270.5 |
| 2,778,123 | 1/57 | Kurtz | 23—290.5 X |
| 2,804,379 | 8/57 | Wistrich et al. | 23—283 X |

MORRIS O. WOLK, *Primary Examiner.*

JAMES H. TAYMAN, JR., *Examiner.*